United States Patent
Li et al.

(10) Patent No.: US 8,487,567 B2
(45) Date of Patent: Jul. 16, 2013

(54) TWO-PHASE BLDC MOTOR

(75) Inventors: Yue Li, Hong Kong (CN); Li Sheng Liu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 234 days.

(21) Appl. No.: 12/960,175

(22) Filed: Dec. 3, 2010

(65) Prior Publication Data

US 2011/0133679 A1 Jun. 9, 2011

(30) Foreign Application Priority Data

Dec. 4, 2009 (CN) .......................... 2009 1 0188716

(51) Int. Cl.
*H02P 6/14* (2006.01)
*H02P 6/08* (2006.01)

(52) U.S. Cl.
CPC ...................................... *H02P 6/085* (2013.01)
USPC ............ 318/400.27; 318/400.26; 318/400.01; 318/696; 318/700; 318/701

(58) Field of Classification Search
CPC ....................................................... H02P 6/085
USPC .................. 318/400.27, 400.26, 400.01, 700, 318/696, 701
See application file for complete search history.

(56) References Cited

U.S. PATENT DOCUMENTS

| | | | | | |
|---|---|---|---|---|---|
| 4,125,792 | A | * | 11/1978 | Schmider | 310/268 |
| 4,704,566 | A | * | 11/1987 | Hirano et al. | 318/400.11 |
| 5,534,760 | A | * | 7/1996 | Jung | 318/442 |
| 6,020,700 | A | * | 2/2000 | Tien | 318/400.38 |
| 7,339,292 | B2 | * | 3/2008 | Ohnishi et al. | 310/49.35 |
| 8,004,141 | B2 | * | 8/2011 | Jeung | 310/186 |

FOREIGN PATENT DOCUMENTS

EP 2028747 A1 2/2009

* cited by examiner

*Primary Examiner* — Walter Benson
*Assistant Examiner* — David Luo
(74) *Attorney, Agent, or Firm* — Muncy, Geissler, Olds & Lowe, PLLC

(57) ABSTRACT

A two-phase BLDC motor comprises a stator and a rotor. The stator has a stator core and a two-phase winding wound on the stator core. The stator core comprises a plurality of teeth with slots formed between adjacent teeth. The rotor rotor has a plurality of magnetic poles formed by at least one permanent magnet. The windings are received in corresponding slots in such a way that each winding spans multiple teeth and the direction of current flowing through the windings in any one slot at any one time is the same.

9 Claims, 3 Drawing Sheets

TWO-PHASE BLDC MOTOR

CROSS REFERENCE TO RELATED APPLICATIONS

This non-provisional patent application claims priority under 35 U.S.C. § 119(a) from Patent Application No. 200910188716.8 filed in The People's Republic of China on Dec. 4, 2009.

FIELD OF THE INVENTION

This invention relates to a two-phase brushless direct current (BLDC) motor.

BACKGROUND OF THE INVENTION

BLDC motors which are also known as electronically commutated motors have electronic commutation systems rather than mechanical commutators and brushes. BLDC motors are widely used in modern electronic devices due to their several advantages over brushed DC motors, such as more torque per unit of weight, higher efficiency, higher reliability, reduced noise, longer lifetime, elimination of sparks from the commutator, and a reduction in electromagnetic interference.

Conventional BLDC motors are usually three-phase BLDC motors as conventional three-phase BLDC motors have a higher efficiency compared to conventional two-phase BLDC motors. However, three-phase BLDC motors have complicated windings and driving circuits and therefore have higher cost.

European Patent No. 2028747 discloses a two-phase BLDC motor which uses concentrated windings and a two-phase driving circuit with a phase difference of 180 electrical degrees. However, in half of each period, the currents of portions of two coils of the windings in the same slot between adjacent poles have opposite directions and therefore these portions do not generate torque. Thus, this kind of two-phase BLDC motor has a low efficiency.

SUMMARY OF THE INVENTION

Hence there is a desire for a two-phase BLDC motor with a higher efficiency or which at least provides the public with a useful choice.

Accordingly, in one aspect thereof, the present invention provides a two-phase BLDC motor comprising: a stator comprising a stator core and two-phase windings wound on the stator core, the stator core comprising a plurality of teeth with slots formed between adjacent teeth; and a rotor rotatable relative to the stator, the rotor comprising a plurality of magnetic poles formed by at least one permanent magnet, wherein the windings are received in corresponding slots in such a way that each winding spans multiple teeth and the direction of current flowing through the windings in any one slot at any one time is the same.

Preferably, the stator core comprises 4n teeth and the rotor has 6n magnetic poles, n being an integer equal to or greater than 1.

Preferably, the windings are powered by currents having a phase difference of ninety electrical degrees.

Preferably, the motor is an inner-rotor type.

Alternatively, the motor may be an outer-rotor type.

Preferably, the windings are controlled by a two-phase half-bridge control circuit.

Preferably, the two-phase half-bridge control circuit comprises four transistors and four diodes.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

A two-phase brushless DC motor of the present invention comprises a stator and a rotor rotatable relative to the stator. The stator comprises a stator core and a two-phase winding wound on the stator core. The winding comprises a number of coils in each phase. Each coil being formed by a plurality of turns of a wire. The stator core comprises 4n teeth with slots formed between adjacent teeth, wherein n is an integer equal to or greater than 1. The windings are received in corresponding slots. Each coil spans two teeth. The coils are wound such that the direction of current flowing through the wires in any one slot at any one time is the same. The rotor has 6n magnetic poles formed by one or more permanent magnets.

The following description of two preferred embodiments of the present invention takes n equal to 1, as an example.

Figure 1:
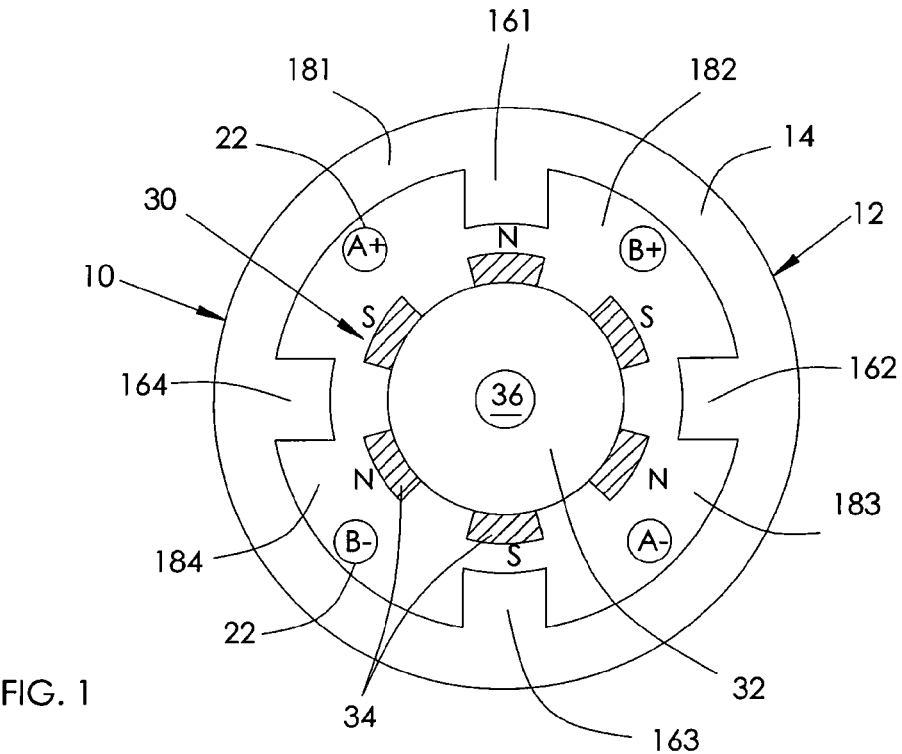
FIG. 1 is a schematic view of a two-phase BLDC motor in accordance with a first embodiment of the present invention.
Figure 2:
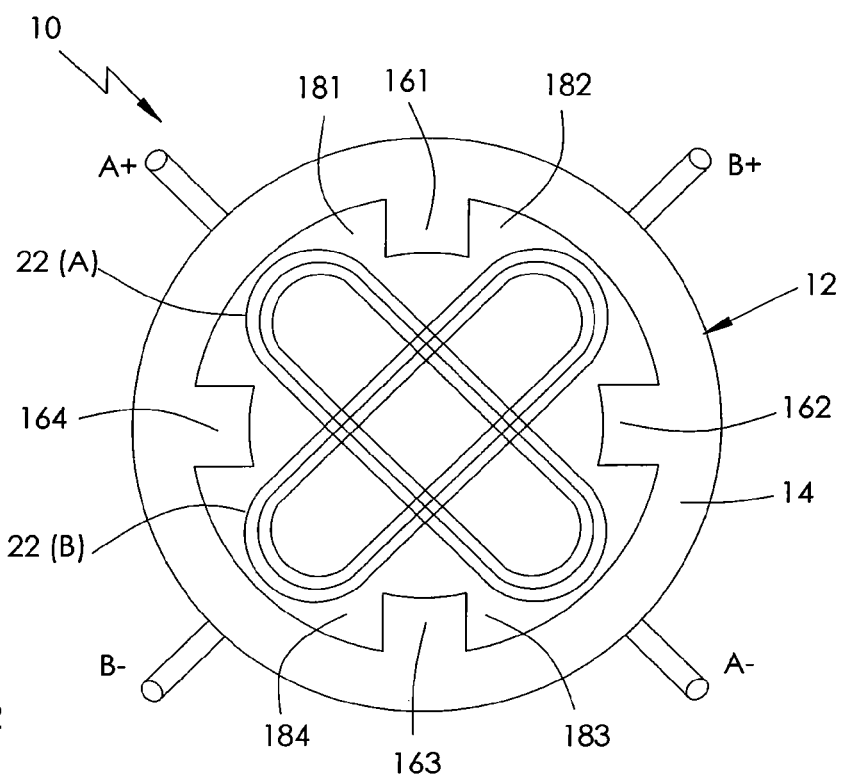
FIG. 2 is a schematic view of a stator of the motor of FIG. 1.

FIGS. 1 and 2 schematically illustrate a two-phase BLDC motor in accordance with a first embodiment of the present invention. FIG. 1 illustrates the stator 10 and the rotor 30 while FIG. 2 illustrates the stator 10 comprising the stator core and the windings 22. The motor is an inner-rotor type and comprises a stator 10 and a rotor 30 rotatably installed in the stator 10. The stator 10 comprises a stator core 12 which comprises a cylindrical yoke 14 and four teeth 161~164 extending inwardly from the yoke 14. The teeth 161~164 are evenly disposed circumferentially about the yoke 14. Slots 181~184 are respectively formed between adjacent teeth 161~164. The two-phase windings 22 comprises winding A and winding B, each formed by a single coil in this example. The winding A spans the teeth 161 and 162 and is received in the slots 181 and 183. The winding B spans the teeth 162 and 163 and is received in the slots 182 and 184. The rotor 30 comprises a rotor core 32 fitted to a shaft 36 and six permanent magnets 34 forming six alternately disposed magnetic poles, i.e., N pole and S pole. The magnets are evenly spaced circumferentially about the rotor core.

Figure 3:
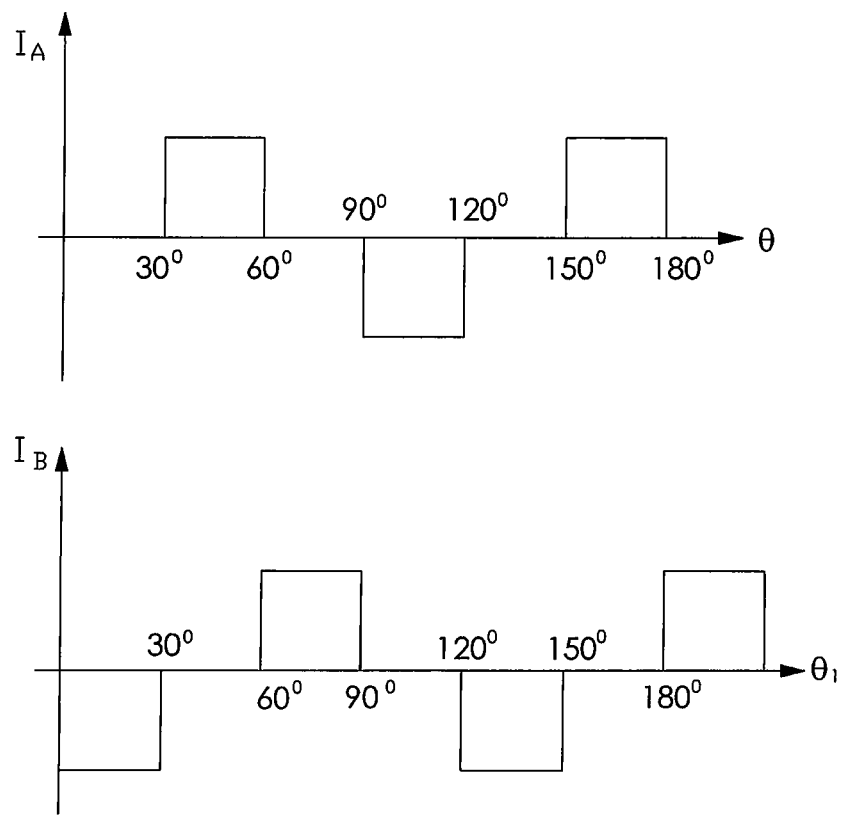
FIG. 3 is a graph showing current through the windings of the stator during use of the motor of FIG. 1.

FIG. 3 is a graph showing the driving current flowing through the windings during operation of the two-phase brushless motor in accordance with an embodiment of the present invention. The windings 22, comprising two separate phase windings, winding A and winding B, are powered by currents having a phase difference of ninety electrical degrees. As such, only one phase winding, A or B, is electrified at any time.

Currents flowing through the windings in the same slot has the same direction and therefore no forces with opposite directions are generated. Thus, the efficiency of the motor is improved compared to the conventional motor.

Figure 4:
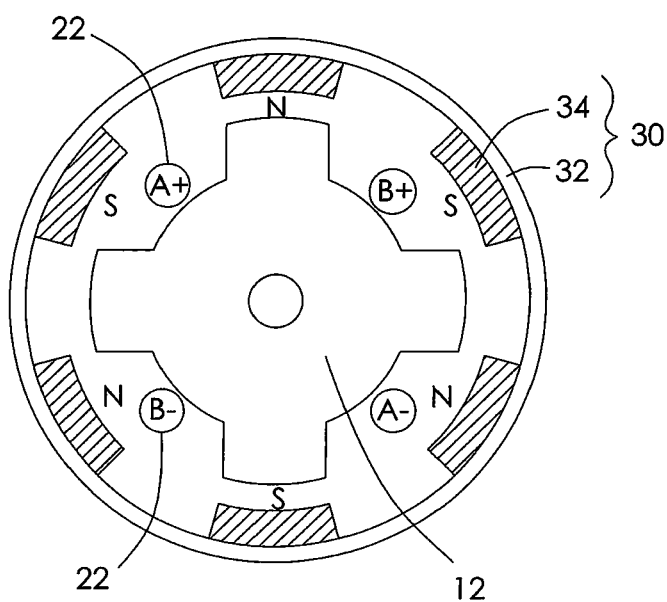
FIG. 4 is a schematic view of a two-phase BLDC motor in accordance with a second embodiment of the present invention.
Figure 5:
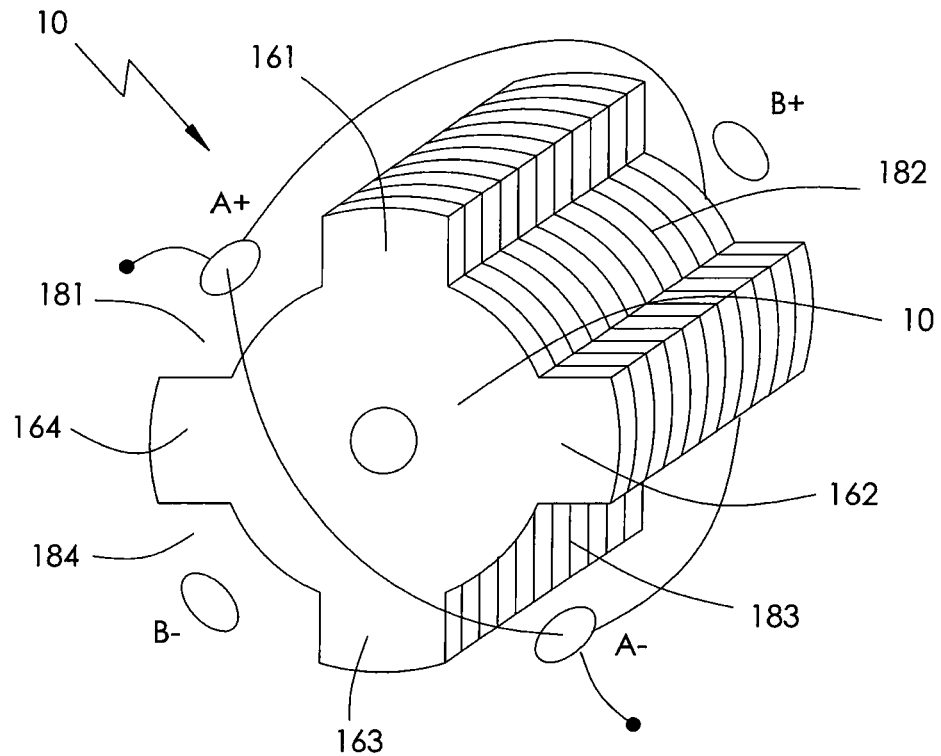
FIG. 5 is a schematic view of the stator of the motor of FIG. 4.

FIGS. 4 and 5 show a two-phase BLDC motor in accordance with second embodiment of the present invention. FIG. 4 illustrates the stator 10 and the rotor 30, while FIG. 5 illustrates the stator 10. This motor is an outer rotor type. The stator 10 is located within the rotor 30. The stator core 12 comprises four teeth 161~164 forming four salient poles. The four teeth 161~164 are evenly arranged in the circumferential direction of the stator 10 with four slots 181~184 respectively formed between adjacent teeth 161~164. The winding A is received in the slots 181 and 183 and winding B is received in the slots 182 and 184. The rotor 30 comprises a rotor core 32 and six permanent magnets 34 fixed to an inner surface of the rotor core 32. The magnets 34 are evenly spaced in the circumferential direction of the rotor 30.

Figure 6:
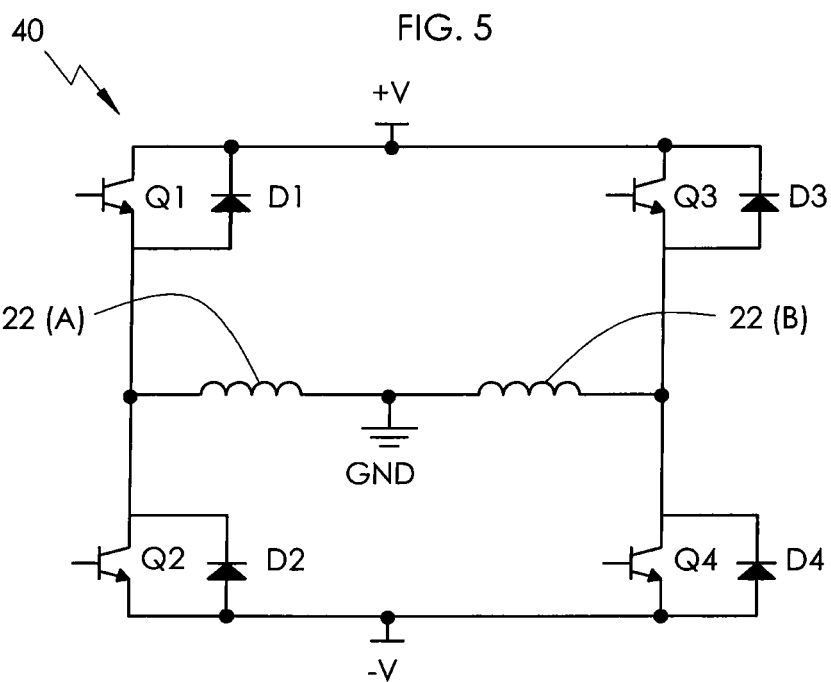
FIG. 6 is a schematic wiring diagram of a driving circuit used to operate a BLDC motor in accordance with an embodiment of the present invention.

FIG. 6 is a schematic wiring diagram of a driving circuit for supplying power (current) to the windings of the motor. The windings are powered or controlled by a two-phase half-bridge control circuit 40 which comprises four transistors Q1 to Q4 and four diodes D1 to D4. A driving current profile, as shown in FIG. 3 can be obtained by controlling the transistors Q1 to Q4.

Compared to current three-phase BLDC motor, the two-phase BLDC motor of the present invention has a simple stator core and windings and a simple driving circuit with few components. Thus, the cost is less. Compared to conventional two-phase motors, the efficiency is higher.

As mentioned, the examples used n equal to 1. Alternatively, n may be equal to 2, 3 or other integer. When n is equal to 2, the stator comprises eight teeth forming eight stator poles and the rotor comprises twelve magnetic poles. Each phase winding spans four teeth.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while he rotor poles have been illustrated as being formed by separate permanent magnets, they could be formed by a single ring magnet or each magnet could form two or more rotor poles.

The invention claimed is:

1. A two-phase BLDC motor comprising:
   a stator comprising a stator core and two-phase windings wound on the stator core, the stator core comprising 4n teeth with 4n slots formed between adjacent teeth, n being an integer equal to greater than 1; and
   a rotor rotatable relative to the stator, the rotor comprising 6n magnetic poles formed by at least one permanent magnet,
   wherein the windings are received in corresponding slots in such a way that each winding spans multiple teeth and the direction of current flowing through the windings in any one slot at any one time is the same.

2. The motor of claim 1, wherein the windings are powered by currents having a phase difference of ninety electrical degrees, and only one winding is electrified at any time.

3. The motor of claim 1, wherein the motor is an inner-rotor type.

4. The motor of claim 1, wherein the motor is an outer-rotor type.

5. The motor of claim 1, wherein the windings are controlled by a two-phase half-bridge control circuit.

6. The motor of claim 5, wherein the two-phase half-bridge control circuit comprises four transistors and four diodes.

7. A two-phase BLDC motor comprising:
   a stator comprising a stator core and two-phase windings wound on the stator core, the stator core comprising 4n teeth with 4n slots formed between adjacent teeth; and
   a rotor rotatable with respect to the stator and surrounding the stator, the rotor comprising 6n magnetic poles formed by at least one permanent magnet,
   wherein the windings are received in corresponding slots in such a way that each winding spans multiple teeth and the direction of current flowing through the windings in any one slot at any one time is the same.

8. The motor of claim 7, wherein the windings are powered by currents having a phase difference of ninety electrical degrees, and only one winding is electrified at any time.

9. The motor of claim 8, wherein the windings are controlled by a two-phase half-bridge control circuit.

* * * * *